UNITED STATES PATENT OFFICE.

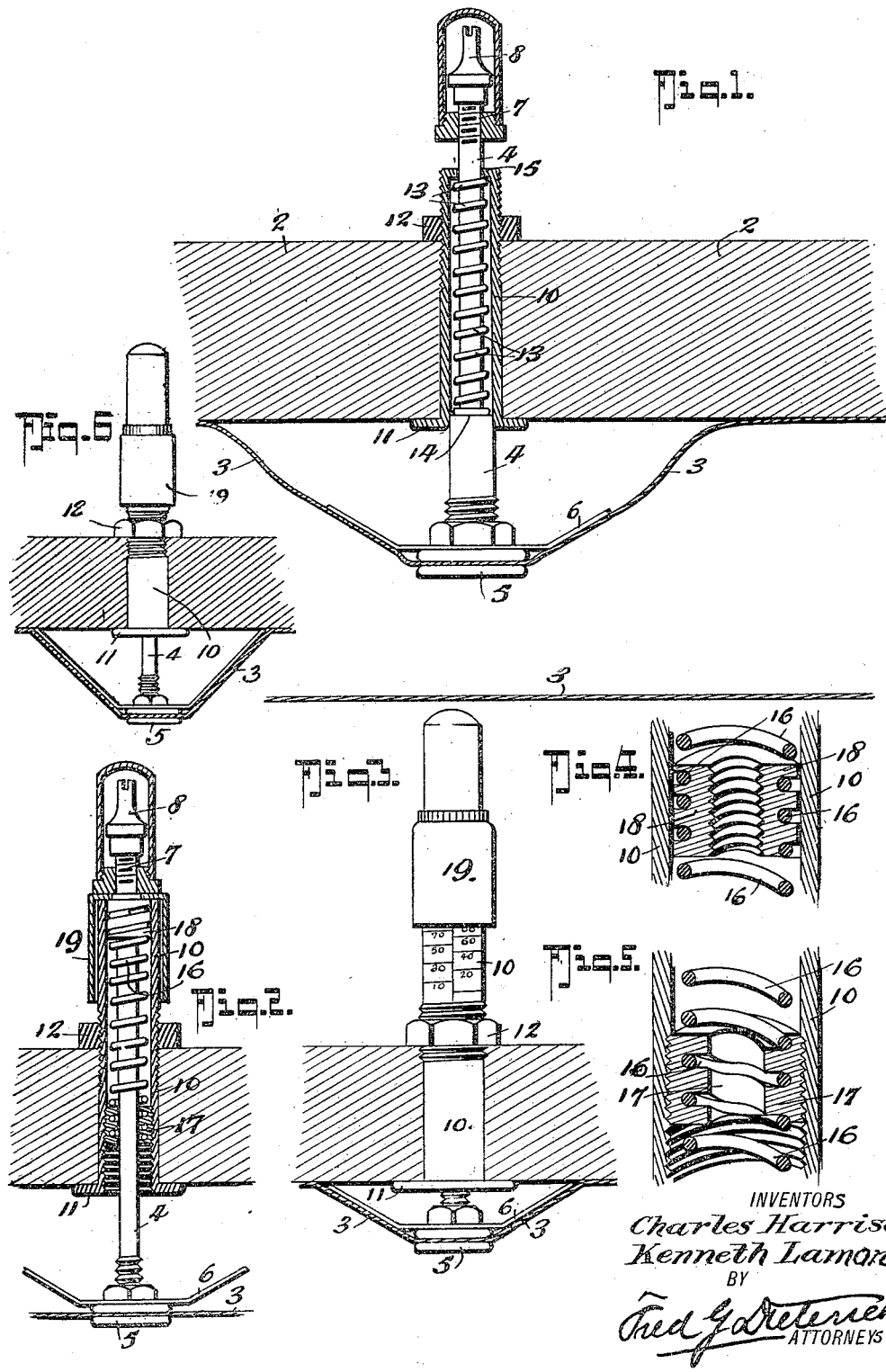

CHARLES HARRISON AND KENNETH LAMOND, OF VANCOUVER, BRITISH COLUMBIA, CANADA, ASSIGNORS TO VANCOUVER MOTOR SUPPLIES LIMITED, OF VANCOUVER, BRITISH COLUMBIA, CANADA.

PNEUMATIC-TIRE-PRESSURE GAGE.

1,214,781. Specification of Letters Patent. Patented Feb. 6, 1917.

Application filed January 11, 1916. Serial No. 71,506.

*To all whom it may concern:*

Be it known that we, CHARLES HARRISON and KENNETH LAMOND, both citizens of the Dominion of Canada, residing at Vancouver, in the Province of British Columbia, Canada, have invented certain new and useful Improvements in Pneumatic-Tire-Pressure Gages, of which the following is a specification.

This invention relates to a pressure gage for a pneumatic tire and is designed to indicate the pressure of the air inflating a pneumatic tire by the expansion of a section of the tire itself, against a spring resistance. This object is attained by projecting through the rim of the wheel into contact with the inner tube of its tire, a member having a spring resistance from its normal or outwardly projected position from the rim. This member, as the tire is inflated, will be pressed inward from the inner circle of the rim against the spring resistance, and will indicate in the amount it is pressed the pressure of the air with which the tire is inflated.

As the valved tube through which a tire is inflated, is attached to the inner tube of a tire and projects through the rim of its wheel, this valved tube itself forms a convenient means for attachment of the pressure indicating spring and scale.

The device is particularly described in the following specification, reference being made to the drawings by which it is accompanied, in which:

Figure 1 is a longitudinal section of the device in its simplest form as applied to the tire valve. Fig. 2, a similar view showing a modification adapted to a tension spring, and Fig. 3, a section of the rim of a wheel and its inner tube showing the valve tube and gage in elevation. Figs. 4 and 5 are detail sections on a larger scale of portions of the invention. Fig. 6 is a detail view of a modification of the invention hereinafter referred to.

In these drawings 2 represents the rim of the wheel and 3 the inner tube of the tire, 4 being the valved tube through which the tire is charged with air, in which tube is the retaining check valve. This valve tube 4 is secured at 5 to the inner tube 3 in the usual manner and is provided with a guard 6 protecting the tire tube 3 adjacent the attachment.

The valve 4, as is usual, projects through an aperture in the rim 2 of the wheel, and is threaded at the outer end, as at 7, for connection to it of the flexible air charging tube and for the cap 8 by which it is protected. Instead of, as is usual, securing the tube 4 in the rim of the wheel it is endwise movable in a tubular bushing 10 which is secured in the rim 2 between a flanged end 11 on the outer side of the rim and a nut 12 threaded onto the tube against the inside of the rim. The inner threaded end projects within the circle of the rim 2 of the wheel toward the end of the valve tube 4.

In its simplest form, a coil compression spring 13 is introduced between a shoulder 14 formed on the valve tube 4 adjacent the attachment of that tube to the tire tube 3 and an inwardly projecting shoulder 15 formed on the inner end of the bushing tube 10, so that as the tire tube 3 is inflated it will press the valve tube 4 through the inner circle of the rim of the wheel against the resistance of the spring 13, and the amount of such inward movement will indicate the pressure with which the tire is inflated.

In its preferred form, as shown in Fig. 3, a coil tension spring 16 is secured at one end to the tubular bushing 10 adjacent the flange 11 and at the other end to the stem 4. These attachments to the bushing and the stem may be made in any approved manner: In the drawing a stem guide bushing 17 is externally threaded to fit in the end of the bushing 10 and the inner end of it is internally threaded that the end of the coil spring may be screwed upon and secured to it. Similarly at the other end, a member 18 is threaded as a nut to fit on the end of the valve tube 4 and the inner end of the member is externally threaded to receive the end of the spring 16. This nut attachment provides a means whereby the tension of the spring may be regulated.

Integral with or secured to the nut member 18, or independently threaded on the valve stem 4, is an indicating sleeve member 19 fitting over the inwardly projecting end of the tubular bushing 10 which is graduated that the position of the edge of the sleeve 19 may indicate the pressure of the air inflating the tire tube 3.

We do not desire to be confined to the particular character of the spring used or to the manner of attachment of the same to the stem 4 and to the rim 2 of the wheel, as the same may be varied within wide limits. The guard member 6 may be lengthened to bear against the rim of the wheel and be made of spring steel so as to form the resilient resistance to inward movement of the tube 4 from the inner tube 3 of the tire.

Having now particularly described our invention, we hereby declare that what we claim as new and desire to be protected in by Letters Patent, is:

1. A tire pressure gage, comprising the combination with the rim of a wheel and the inner tube of a tire, of a bushing tube secured to the rim and passing through the aperture in the same, a tire valve member endwise movable in said bushing tube, means for clamping the inner end of said member to the inner tube, said tire valve member adapted to be pressed outwardly by the inflation of the inner tube, resilient means opposing the outward movement and a tire inflating valve within said tire valve member, said tire valve member having a passage through the same controlled by said tire inflating valve whereby the inner tube of the tire may be inflated through said tire valve member.

2. A tire pressure gage, comprising the combination with the rim of a wheel and the inner tube of a tire, of a bushing tube secured to the rim and passing through an aperture in the same, a tubular tire valve member endwise movable in said bushing tube, a tire inflating valve in said tubular tire valve member whereby the tire may be inflated through said tire valve member, means for clamping the inner end of said member to the inner tube, said tire valve member adapted to be pressed outwardly by the inflation of the inner tube, resilient means opposing the outward movement, and pressure indicating instrumentalities coöperating with said tire valve member and said bushing tube for indicating the air pressure within the tire tube.

3. A tire pressure gage, comprising the combination with the rim of a wheel and the inner tube of a tire, of a bushing tube secured to the rim and passing through the aperture in the same, a tire valve member endwise movable in said bushing tube, and having a passage through which the tire may be inflated, a tire inflating valve in said valve member passage, means for clamping the inner end of said member to the inner tube, said tire valve member adapted to be pressed outwardly by the inflation of the inner tube, resilient means opposing the outward movement, and a guard member located between the rim and the tire tube adjacent to the tire valve member.

4. A tire pressure gage, comprising the combination with the rim of a wheel and the inner tube of a tire, of a bushing tube secured to the rim and passing through the aperture in the same, a tire valve member endwise movable in said bushing tube, said tire valve member having a passage through the same and an inflating valve located in said passage whereby the tire may be inflated through said tire valve member, means for clamping the inner end of said member to the inner tube, said tire valve member adapted to be pressed outwardly by the inflation of the inner tube, resilient means opposing the outward movement, a guard member located between the rim and the tire tube adjacent to the tire valve member, said pressure indicating instrumentalities comprising graduation marks on said bushing tube and an indicating sleeve carried by said tire valve member and fitting over said bushing tube to coöperate with said graduation marks substantially as shown and described.

5. A tire pressure gage, comprising the combination with the rim of a wheel and the endwise slidable valve tube through which the inner tube of the tire is inflated, of a spring one end of which is connected to the rim of the wheel and the other end to the valve tube, means for indicating endwise movement of the valve tube, and means for securing the inner end of said valve tube to the inner tube of the tire, an inflating valve in said valve tube, said valve tube being adapted to communicate with the interior of the inner tube of the tire whereby the tire may be inflated through said valve tube.

6. A tire pressure gage comprising in combination with the rim of a wheel having a tire valve aperture, and the inner tube of a tire, of an inflating valve tube endwise movable in the rim aperture, an inflating valve in said tube, means for securing the inner end of said valve tube in air-tight engagement with the inner tube of the tire whereby said inner tube may be inflated through said valve tube member, said valve tube member adapted to be pressed outwardly by the inflation of the inner tube of the tire, and resilient means opposing the outward movement of the tire valve tube.

7. A tire pressure gage comprising a bushing tube adapted to pass through the valve aperture in the rim of a wheel, means for clamping said tube rigidly to the rim, a tire valve stem passing through said bushing tube, a tire valve proper in said stem, means for clamping the inner end of said stem securely to a tire tube whereby the tube may be inflated through the stem, said valve stem having its outer end threaded, means on said threaded end of the valve stem for engaging said bushing tube, a spring within said bushing tube and adapted to resist the movement of said tire valve stem against the air pressure in the tire tube, and pressure indicating instrumentalities coöperating with the stem and bushing, substantially as shown and described.

8. In a tire pressure gage, the combination with the rim of the wheel and the inner tube of the tire, of a valve casing endwise movable in the rim of the wheel, an inflating valve in said valve casing the inner end of which valve casing is in engagement with the inner tube of the tire, and adapted to be pressed outwardly by the inflation of the tube, a plug in the rim, said plug having a bore for the passage of said endwise movable valve casing and having a spring securing groove, a coil spring having one end seated in said spring securing groove, and surrounding said endwise movable member, a second bushing on said endwise movable valve casing, said second bushing also having a spring receiving and securing groove in which the other end of said spring is seated, all being arranged whereby the tire may be inflated through said valve casing, substantially as shown and described.

9. In a tire pressure gage, the combination with the rim of the wheel and the inner tube of the tire, of a valve casing endwise movable in the rim of the wheel, an inflating valve within said valve casing whereby the tire may be inflated through said valve casing, the inner end of which valve casing is in engagement with the inner tube of the tire and adapted to be pressed outwardly by the inflation of the tube, a plug in the rim, said plug having a bore for the passage of said endwise movable valve casing and having a spring securing groove, a coil spring having one end seated in said spring securing groove, and surrounding said endwise movable valve casing, a second bushing on said endwise movable valve casing, said second bushing also having a spring receiving and securing groove in which the other end of said spring is seated, and a tubular member for inclosing said spring and means on said endwise movable valve casing for indicating the pressure within the tire tube.

10. In a tire pressure gage, the combination with the rim of the wheel and the inner tube of the tire, of a member endwise movable in the rim of the wheel, the inner end of which member is in engagement with the inner tube of the tire and adapted to be pressed outwardly by the inflation of the tube, a plug in the rim, said plug having a bore for the passage of said endwise movable member and having a spring securing groove, a coil spring having one end seated in said spring securing groove, and surrounding said endwise movable member, a second bushing on said endwise movable member, said second bushing also having a spring receiving and securing groove in which the other end of said spring is seated, a tubular member for inclosing said spring, means on said endwise movable member for indicating the pressure within the tire tube, said movable member comprising an inflation valve stem, means for securing said stem to the inner tube whereby the inner tube may be inflated through said stem, and a guard member carried by said stem adjacent the inner tube, substantially as shown and described.

In testimony whereof we affix our signatures.

CHARLES HARRISON.
KENNETH LAMOND.